E. Whitney,
Horse Collar,
No. 1,607, Reissued Jan. 19, 1864.
Fig. 1.
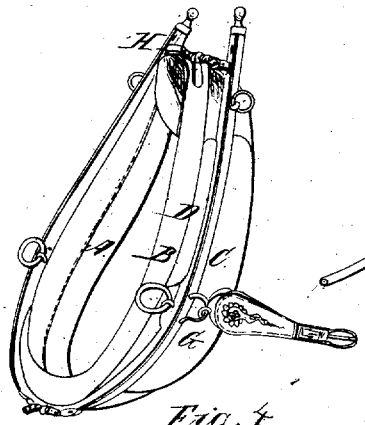
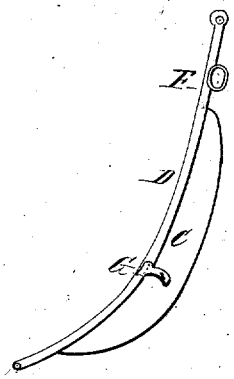
Fig. 2.
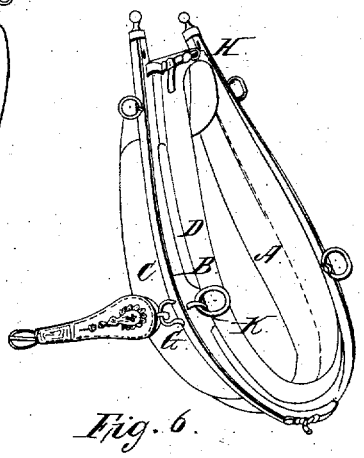
Fig. 4.
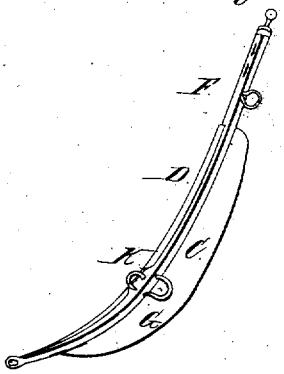
Fig. 5.
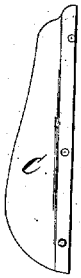
Fig. 6.
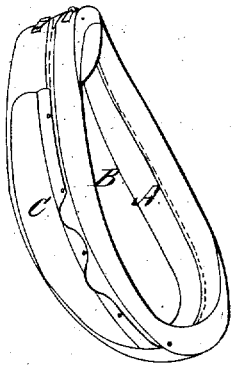
Witnesses:
Marcus P. Norton
R. N. Reille
Inventor:
Edward Whitney
N. PETERS, PHOTO-LITHOGRAPHER, WASHINGTON, D. C.

UNITED STATES PATENT OFFICE.

EDWARD WHITNEY, OF ALBANY, NEW YORK.

IMPROVEMENT IN HORSE COLLARS AND HAMES.

Specification forming part of Letters Patent No. 40,440, dated October 27, 1863; Reissue No. 1,607, dated January 19, 1864.

*To all whom it may concern:*

Be it known that I, EDWARD WHITNEY, of the city and county of Albany, State of New York, have invented new and useful Improvements in Horse-Collars and Hames, and that Letters Patent of the United States were granted to me on the 27th day of October, A. D. 1863, under the title of "Improvement in Horse-Collars"; and I do hereby declare that the following is a full, clear, and exact description thereof under the aforesaid title of "Improvements in Horse-Collars and Hames," reference being hereby had to the accompanying drawings, which make a part of this specification.

Like letters represent and refer to like or corresponding parts.

Figure 1 is a perspective view on the left. Fig. 2 is also a perspective view on the right, thereby showing a shield upon the right and left sides of the collar, &c. Fig. 3 shows shield and hame in one piece. Fig. 4 shows shield and hame in two pieces, but fastened in combination in a rigid manner. Fig. 5 shows the shield separate from the hame. Fig. 6 shows the shield rigidly connected to the collar.

The nature of my invention and improvement consists in the employment of suitably-constructed shields or plates in combination with the collar or hames, or both, as the case may be, in the manner substantially as herein described and set forth, so that the pressure by draft upon and against that part of the horse, mule, or other animal, whereon such collars are used for the purpose of draft, is more even and equal for such purpose by reason of such pressure being distributed in such manner upon that part of such collar which thus comes in contact with the horse, &c., by means of such shields or plates, in the manner substantially as herein described and set forth.

To enable others skilled in the art to which my said invention and improvements relate to make and use the same, I will here proceed to describe the construction and the operation of the same, which is as follows, to wit:

I construct the shields or plates C of any material which will answer the purposes required, and which are made in form or shape upon that side next adjoining the collar A B to correspond in form or shape to such side of said collar, so as to give even or equal pressure upon the said collar when in use. The said shields or plates may be of any length or width deemed best in order to produce the desired effect, which is to so equalize the pressure caused by draft upon that part of the horse or other animal on which the collar is used as to prevent galls, sores, and the like upon such part of the horse or other animal coming in contact therewith, and at the same time allow such to work freely and without injury to such horse or other animal otherwise than above named. The said shields or plates, when made separate, as shown in Fig. 5, are securely fastened to the hames D D in any convenient and durable manner, or, instead thereof, they may be thus fastened to the collar itself, as shown at Fig. 6. When thus fastened to the hame, the whole for one side will appear, as shown at Fig. 4. If found more convenient for any purpose the hame and the said shield may be made in one piece, as shown at Fig. 3, which may be of cast-iron made thereafter malleable. When this shield is made separate from the hame, it may also be cast of iron and then made malleable, if thought best so to do, or it may be made of wrought-iron and swaged out into proper shape between two dies constructed for that purpose, and that part coming in close proximity to the hame will be of shape or form to correspond to that of the said hame and with that of the collar on which the same is to be used. If the hame is a flat one, then the surface of the said shield or plate on which such hame rests should be made flat to correspond therewith, whereby the surface between the hame and the shield or plate is equal and firm. The said shield or plate may extend upon or over these sides of such hame and then be securely fastened, if deemed best so to do. So, on the other hand, when fastened to the collar instead of to the hame, it may thus be constructed, the principle in all cases being the same, though in mechanical form or proportion they may be somewhat different. This shield will be used upon each side of the collar, as shown by the Figs. 1 and 2. The collar A B is made in the usual manner. The hames D and D are joined at the top and also at the bottom in the usual manner, or in any other manner which will answer the same purpose, and which will hold the respective shields or plates C and C and the respective hames D and D in their proper and respective places upon and with the said collar A B. This shield or plate not only gives equal pressure upon said collar, and thereby upon that part of the horse or other animal on which such collar is used, which, during the draft, comes in immediate contact therewith, and thereby preventing sores, galls, or other injuries to such horse or other animal, but it secures and prevents undue wear of the collar when used, and especially that part where the tugs or traces are joined to and with the said hame, as shown at G and G, Figs. 1, 2. When the horse, mule, or other animal wearing such collar, draws, the pressure is distributed over the whole surface of the said shield or plate from the bottom or lower end to the top or upper end thereof, whereby the collar is kept in good shape and not subjected to uneven or unequal strain, and cannot press against the throat of the said horse or other animal using the same so as thereby to prevent full and free breathing. No galls or sores will be liable to be made upon any horse, mule, &c., on which such collar, shields, and hames are used by reason of the draft to which the same are subjected, by the said collar coming in contact with the shoulder or shoulders of said horse, &c., during the time or operation of the draft, as aforesaid. The "stuffings" of the collar can be adjusted by removing the plates or shields aforesaid, and cutting the shoulder-piece in any manner desired, after which they can be replaced and thereby cover the opening thus made; and should the horse, mule, &c., be previously galled or made sore, the hard stuffing can be easily removed from over that part sore and galled, and soft wool or other material inserted, if found necessary so to do, in which case the face of the collar will then bear against the whole shoulder not galled or sore, and thereby leave the said sore part free to heal. These said shields or plates may be applied to any kind of collars used upon horses, mules, &c., and are simple, cheap, strong, durable, and of great utility in the use of such collars, and especially are they of great usefulness upon "army," "canal," and "farm" horses where heavy draft is required, as is the case of such horses, mules, &c. Any horse can draw more weight with a collar having thereon such shields or plates constructed and combined substantially as aforesaid, and with much greater ease than by any other known means applied to such horse, &c.

Having thus described the nature, construction, and operation of my said invention and improvement, what I claim, and desire to secure by Letters Patent of the United States of America, is—

1. The metallic shield or plate C, constructed substantially as and for the purposes herein described and set forth.

2. The combination of the metallic shield or plate C, in combination with the collar A B, substantially as and for the purposes herein described and set forth.

3. The combination of the metallic shield or plate C, or any equivalent therefor, with the hame D, in the manner substantially as and for the purposes herein described and set forth.

4. As a whole, the combination of the metallic shield C, or its equivalent, the hame D, and the collar A B, in the manner and for the purposes substantially as herein described and set forth.

In testimony whereof I have, on this 8th day of December, A. D. 1863, hereto set my hand.

EDWARD WHITNEY.

Witnesses:

MARCUS P. NORTON,

R. H. REILLE.